(12) United States Patent
Tarr

(10) Patent No.: US 7,068,972 B2
(45) Date of Patent: Jun. 27, 2006

(54) HOME AREA NETWORK INCLUDING ARRANGEMENT FOR DISTRIBUTING AUDIO PROGRAMMING INFORMATION FROM A PLURALITY OF SOURCE OVER LOCAL RADIO BROADCAST

(75) Inventor: Morton Tarr, Bolton, MA (US)

(73) Assignee: Ucentric Holdings, Inc., Horsham, PA (US)

( * ) Notice: Subject to any disclaimer, the term of this patent is extended or adjusted under 35 U.S.C. 154(b) by 954 days.

(21) Appl. No.: 09/823,289

(22) Filed: Mar. 30, 2001

(65) Prior Publication Data

US 2001/0034205 A1 Oct. 25, 2001

Related U.S. Application Data

(60) Provisional application No. 60/193,813, filed on Mar. 31, 2000.

(51) Int. Cl.
*H04H 7/00* (2006.01)

(52) U.S. Cl. .................... 455/3.06; 455/141.1; 725/109
(58) Field of Classification Search ................ 455/3.06, 455/3.04, 3.05, 414.1, 414.4, 561, 168.1; 381/118, 119, 315, 77, 81; 348/485, 515, 348/738; 707/501, 513; 725/32, 109, 110, 725/111, 74, 80; 370/352
See application file for complete search history.

(56) References Cited

U.S. PATENT DOCUMENTS

| | | | |
|---|---|---|---|
| 4,608,699 A | 8/1986 | Batlivala et al. | |
| 5,389,964 A | 2/1995 | Oberle | |
| 5,512,963 A | 4/1996 | Mankovitz | |
| 5,572,442 A | 11/1996 | Schulhof et al. | |
| 5,585,837 A | 12/1996 | Nixon | |
| 5,646,942 A | 7/1997 | Oliver et al. | |
| 5,805,806 A | 9/1998 | McArthur | |
| 5,822,440 A | 10/1998 | Oltman et al. | |
| 5,905,942 A | 5/1999 | Stoel | |
| 5,912,917 A | 6/1999 | Engelbrecht et al. | |
| 5,982,363 A | 11/1999 | Naiff | |
| 5,982,445 A | 11/1999 | Eyer et al. | |
| 5,983,068 A | 11/1999 | Tomich et al. | |
| 6,005,861 A | 12/1999 | Humpleman | |
| 6,058,178 A | 5/2000 | McKendry et al. | |
| 6,069,899 A | 5/2000 | Foley | |
| 6,167,120 A | 12/2000 | Kikinis | |
| 6,188,684 B1 * | 2/2001 | Setoyama et al. | 370/352 |
| 6,481,013 B1 * | 11/2002 | Dinwiddie et al. | 725/80 |
| 6,526,581 B1 | 2/2003 | Edson | |
| 6,654,025 B1 | 11/2003 | Kaczowka | |

OTHER PUBLICATIONS

Baxter, T., "Video Distribution in the Eureka–IHS Network," IEEE Transactions on Consumer Electronics, 34(3): 736–732 (1988) (XP 000098394).

* cited by examiner

*Primary Examiner*—Edward F. Urban
*Assistant Examiner*—Thuan T. Nguyen
(74) *Attorney, Agent, or Firm*—Benjamin D. Driscoll

(57) ABSTRACT

An audio program distribution arrangement for use in connection with a server in a home area network is described. The audio program distribution arrangement is configured to distribute audio programming over a local audio link. The audio program distribution arrangement comprises an audio programming information receiver module, an audio programming information assembler module and a control module. The audio programming information receiver module is configured to receive audio programming information from a plurality of sources. The audio programming information assembler module is configured to generate assembled audio programming information by selectively assembling said audio programming information as received by the audio programming information receiver module into a selected set of frequencies for transmission over the local audio link. The control module configured to control the audio programming information receiver module and the audio programming information assembler module.

11 Claims, 2 Drawing Sheets

HOME AREA NETWORK INCLUDING ARRANGEMENT FOR DISTRIBUTING AUDIO PROGRAMMING INFORMATION FROM A PLURALITY OF SOURCE OVER LOCAL RADIO BROADCAST

INCORPORATION BY REFERENCE

U.S. patent application Ser. No. 09/365,726, filed Aug. 3, 1999, in the name of Richard Edson, entitled "Multi-Service In-Home Network With An Open Interface" and assigned to the assignee of this application, incorporated by reference.

U.S. Provisional Patent Application Ser. No. 60/193,813, filed Mar. 31, 2000, in the name of Theodore F. Tabloski, et al., entitled "Home Area Network" and assigned to the assignee of this application, incorporated by reference.

FIELD OF THE INVENTION

The invention relates generally to the field of user-premises or home area networking, to allow different types of systems and/or communications devices to utilize one in-home network to communicate with each other and to access a number of external communication services, and more specifically to systems and methods of providing audio programming information from a plurality of sources to radio receivers over local radio broadcast.

BACKGROUND OF THE INVENTION

U.S. patent application Ser. No. 09/365,726, filed Aug. 3, 1999, in the name of Richard Edson, entitled "Multi-Service In-Home Network With An Open Interface" (hereinafter "the Edson application") and U.S. Provisional Patent Application Serial No. 60/193,813, filed Mar. 31, 2000, in the name of Theodore F. Tabloski, et al., entitled "Home Area Network" (hereinafter "the Tabloski, et al., application") describe various embodiments of an in-home network and server therefor that provides a number of services. Generally, one of the services is to distribute audio program information to, for example, conventional radio receivers for playing thereby.

SUMMARY OF THE INVENTION

The invention provides a new and improved system for and method of providing, in connection with a home area network that includes a home server, audio programming information to conventional radio receivers that are local to the home containing the home area network.

In brief summary, the invention provides an audio program distribution arrangement for use in connection with a server in a home area network, the audio program distribution arrangement being configured to distribute audio programming over a local audio link. The audio program distribution arrangement comprises an audio programming information receiver module, an audio programming information assembler module and a control module. The audio programming information receiver module is configured to receive audio programming information from a plurality of sources. The audio programming information assembler module is configured to generate assembled audio programming information by selectively assembling said audio programming information as received by the audio programming information receiver module into a selected set of frequencies for transmission over the local audio link. The control module configured to control the audio programming information receiver module and the audio programming information assembler module.

In one embodiment, the audio program distribution arrangement includes a broadcast arrangement configured to broadcast the assembled audio programming information over a wireless audio link. The broadcast arrangement comprises a base module and at least one remote module. The base module is configured to receive the assembled audio programming information from the audio programming information assembler module and transmit the assembled audio programming information over a second selected set of frequencies. The at least one remote module configured to receive the assembled audio programming information over the second selected set of frequencies and to convert the received assembled audio programming information to the first selected set of frequencies for broadcast over the wireless audio link. The first selected set of frequencies comprises frequencies that can be received by conventional broadcast radio receivers, such as frequencies comprising the FM radio band. The second selected set of frequencies comprises frequencies at which the assembled audio programming information can be broadcast at a higher power than is permitted in the FM radio band, such as frequencies proximate 900 MHz.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
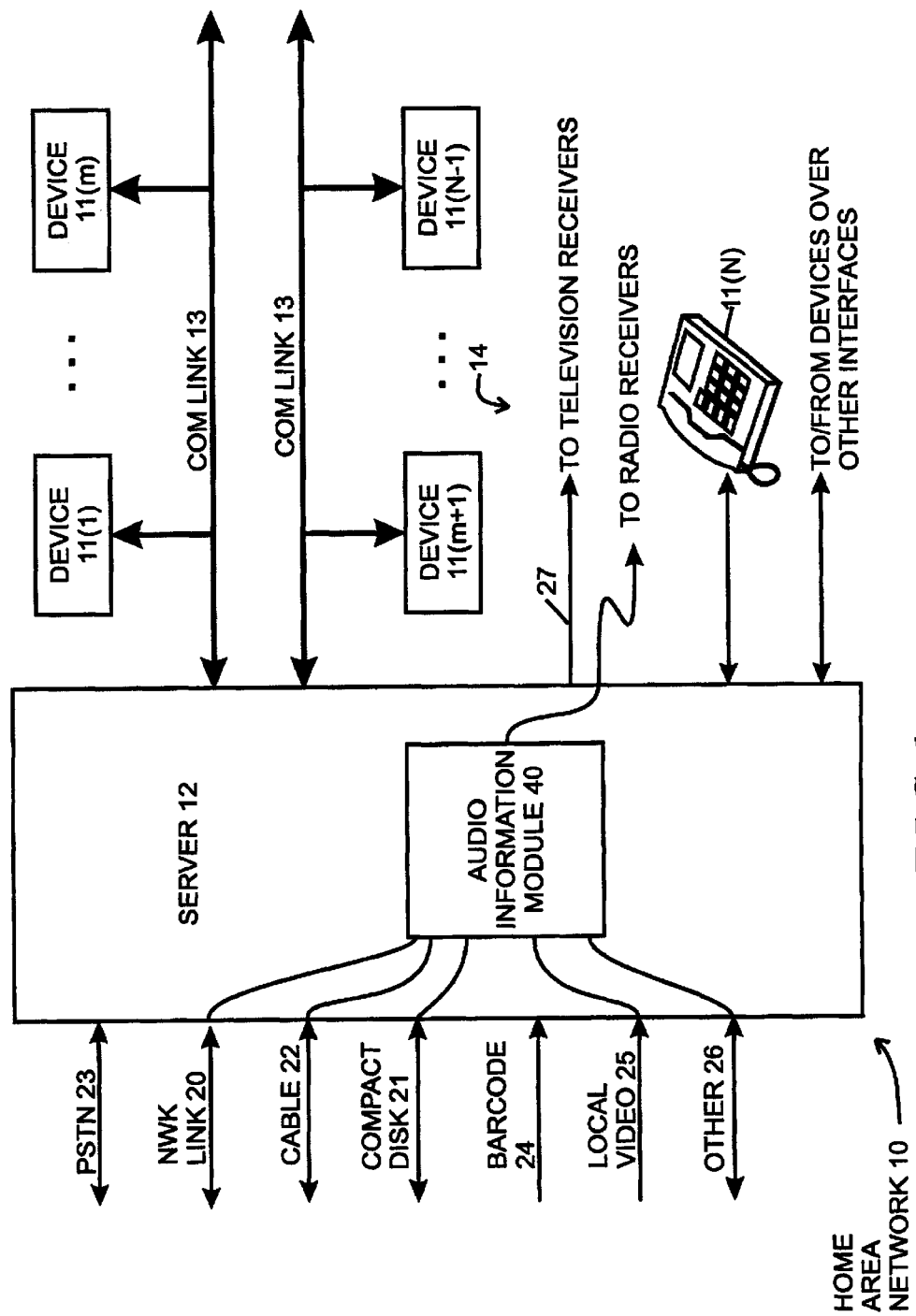
FIG. 1 depicts a home area network including an arrangement for providing audio programming information to radio receivers that are local to the home area network, using local generally low-power radio broadcast, constructed in accordance with the invention.

FIG. 1 depicts a home area network 10 including an arrangement for providing audio programming information to radio receivers that are local to the home area network, using local generally low-power radio broadcast, constructed in accordance with the invention. Generally, the home area network 10 facilitates the connection of a plurality of household appliances, devices, television and radio receivers, telephone sets, and other facilities (generally "devices") 11(*l*) through 11 (N) (generally identified by reference numeral 11(*n*)) to a home server 12 over one or more digital communication links generally identified by reference numeral 13 and one or more analog communication links generally identified by reference numeral 14. The home server 12 can also connect to a number of external connections, including a central office in the public switched telephony network (PSTN) over a PSTN link 23, a network such as the Internet over a network link 20, a cable connection (for use in providing cable television, telephony, Internet and other services as will be apparent to those skilled in the art) over cable link 22, a compact disk player over a compact disk link 21, a barcode reader over barcode link 24, a local video source 25, and perhaps other devices (such as devices providing information via satellite and the like, home security devices, and so forth) over other links generally identified by reference numeral 26.

As described in, for example, the aforementioned Edson and Tabloski, et al, applications, the devices 11(n) can transfer information among themselves over the respective communication link 13, 14 to which they are connected. In addition, the devices 11(n) connected to one communication link 13, 14 can transfer information to devices connected to another communication link 13, 14 and between the devices 11(n) and the PSTN, network, cable, etc., through the server 12; in that operation, if one device 11(n') is connected to an analog communication link 14 and another device 11(n") (n"≠n') is connected to a digital communication link 13, the server 12 can perform a digital to analog or analog to digital conversion as necessary. In addition, the server 12 operates to store information received from the PSTN, network, cable, and devices 11(n) for later transmission over the PSTN, network, cable, etc., and later transmission to the devices 11(n). The information transferred over communication links 13 is preferably in digital form, as is the information stored on the server. On the other hand, information may be transferred over other connections in digital or analog form as appropriate.

The devices 11(n) that can be connected to the home area network 10 can include a number of types of appliances, including but not limited to devices such as personal computers, personal digital assistant (PDA) devices, telephony devices (illustratively device 11(N)), and home entertainment devices such as radio and television receivers, DVD, compact disk, video and audio tape and record players, and the like. In addition, devices 11(n) that can be connected to the home area network can include lighting, heating and cooling, and similar systems, as well as appliances such as stoves and ovens. If a particular device is a "legacy" device, that is, a device that itself does not have an interface that can be connected to a digital communication link 13, that legacy device can be provided with a suitable interface to allow it to be so connected.

Generally, the home area network 10 operates to allow information to be stored on the server 12, transferred among the devices 11(n), and transferred from or to a number of external sources or destinations, including, for example, sources or destinations over a network such as the Internet or the public switched telephony network (PSTN), cable or satellite television or radio, music sources such as compact disks. The information may comprise any form of information, including, for example, audio information, image and video information, information in text form, control information for, for example, controlling one device from another or from the server 12 in relation to, for example, occurrence of certain events, computer programs, and so forth. The home area network can be used to, for example, transfer audio information from sources to destinations such as the server 12 for storage or to various devices 11(n) for playing. Similarly, the home area network 10 can be used to transfer image or video information from sources to destinations such as the server 12 for storage or to various devices 11(n) for display. In addition, the home area network 10 can be used to transfer control information to control controllable devices, such as lighting, appliances such as stoves and ovens, heating and cooling systems, alarm systems and the like.

The communication links 13 may be in any form, including a hard link such as a wire, optical fiber or other arrangement for transferring electrical, optical or other signals among the appliances. Alternatively or in addition, communication links 13 may comprise wireless links, such as but not limited to infrared links or links provided by signals in other parts of the electromagnetic spectrum. Communication links 13 may comprise communication links specially provided for the home area network 10, and/or they may include pre-existing links such as telephone lines, wiring provided for, for example, AC power distribution, and the like.

Each device 11(n) connected to a digital communication link 13 preferably includes or is provided with an interface (not separately shown) that enables it to transmit information, in the form of message packets to, and/or receive information in the form of message packets from each other and the home server 12 over the respective communication link 13. When a device 11(n) receives message packets containing information, it can use the information as described below.

Generally, the server 12 includes a number of components (not separately shown), including components for processing, storing and retrieving data in digital form, and for converting data between digital and analog form. With particular reference to the instant invention, the home area network 10, and, in particular, server 12, provides an arrangement whereby audio program information provided by any of a plurality of sources can be broadcast over a local radio broadcast using low-power transmission for reception by radio receivers local to the home that includes the home area network 10. Sources of audio program information may include, for example, sources of audio information received through the network link 20, the cable link 22, the compact disk link 21 and the other links 26. In addition, if the server 12 receives audio information from a local video source over local video link 25, it may also broadcast that audio information. Sources available through the network link 20 and/or the cable link 22 may include sources available over networks such as the Internet, and may include, for example, audio sources that broadcast audio programs over the Internet or through the cable system, as well as audio sources from which individual items can be retrieved, and other audio sources that will be appreciated by those skilled in the art. Sources available through the cable link 22 may also include the audio component of television program information received therethrough. The compact disk link 21 may provide audio information from conventional compact disks DVD's, and the like, and, of the DVD's and other disks that provide program information that has both a video component and an audio component, can also include the audio component of the program information.

The home server 12 includes an audio information module 40 to broadcast audio program information to the one or more radio receivers that are located in, for example, the home that includes the home area network 10, using low-power broadcast techniques. In one embodiment, the audio program information provided by the audio information module 40 is in analog form, and, specifically, is in the FM ("frequency modulated") radio band of approximately 88–108 MHz (megahertz) that can be received by conventional FM radio receivers.

The audio program information provided by audio information module 40 may originate from a number of sources. For example, the audio information module 40 may receive audio program information, from a cable provider, satellite connection or the like over the cable link 22. The audio information module 40 may also receive audio program information over, for example, a network such as the Internet over the network link 20. The audio information module 40 may also receive audio information, along with video information that will not be used in connection with audio information module 40, over local video link 25. The audio information module 40 may also receive audio information over the compact disk link 21.

In addition, the audio information module 40 may receive textual information, which it can process, in a manner similar to a voice synthesizer, to convert to spoken audio form which can be used as audio program information for transmission to the radio receivers. For example, the textual information may be in the form of Web pages encoded in HTML form, Emails, or other textual information that may be received over, for example, network link 20. The textual information may also be in the form of digital books which may be received over the network link 20, compact disk link 21, or other links 26. Textual information may also be generated by the server 12 itself, and may include, for example, notifications regarding changes of status of security alarm systems, notifications of incoming telephone calls and notifications of other occurrences as will be apparent to those skilled in the art.

The audio information module 40 may also receive other forms of information which it may use as audio programming information to be broadcast to the radio receivers, as will be apparent to those skilled in the art.

The audio information module 40 will be described in connection with FIG. 2. Generally, the audio information module 40 includes a plurality of modules, including a base module 41 and one or more remote modules 42. The base module 41 is generally co-located with other elements comprising the server 12, including interfaces to the various links 20, 21, 22, 25 and 26 from which the audio program information is received. The remote modules 42, on the other hand, can be distributed throughout the home area to be covered. Under current United Stated government (Federal Communications Commission) regulation, the amount of power that can be used in the FM frequency band may be insufficient to permit good reception everywhere in a home, and several remote modules 42 may be distributed throughout the home serviced by the server 12 to facilitate coverage throughout. The base module 41 distributes audio program information to the remote modules 42 in a band in which higher power levels can be used. The remote modules 42 receive the audio program information from the base module 41 and transmit it in the FM frequency band. In one embodiment, the base module distributes the audio program information to the remote module in the 900 MHz band (more specifically, the 902–928 MHz), which, under current regulation, allows for use of sufficient power to facilitate reliable distribution throughout the home serviced by the server 12. In that embodiment, the base module 41 generates one or more FM signals of selected carrier frequency or frequencies in the FM radio band, the number of FM signals depending on the number of audio programs to be broadcast, and modulates the FM signal(s) into the 900 MHz band for transmission to the remote modules 42. The remote modules 42, in turn, modulates the signal(s) in the 900 MHz band back into the FM band for broadcast thereby. Since the FM signal(s) are generated in one location, that is, in the base module 41, only one signal generator will be required for respective audio programs to generate the FM signal therefor.

Figure 2:
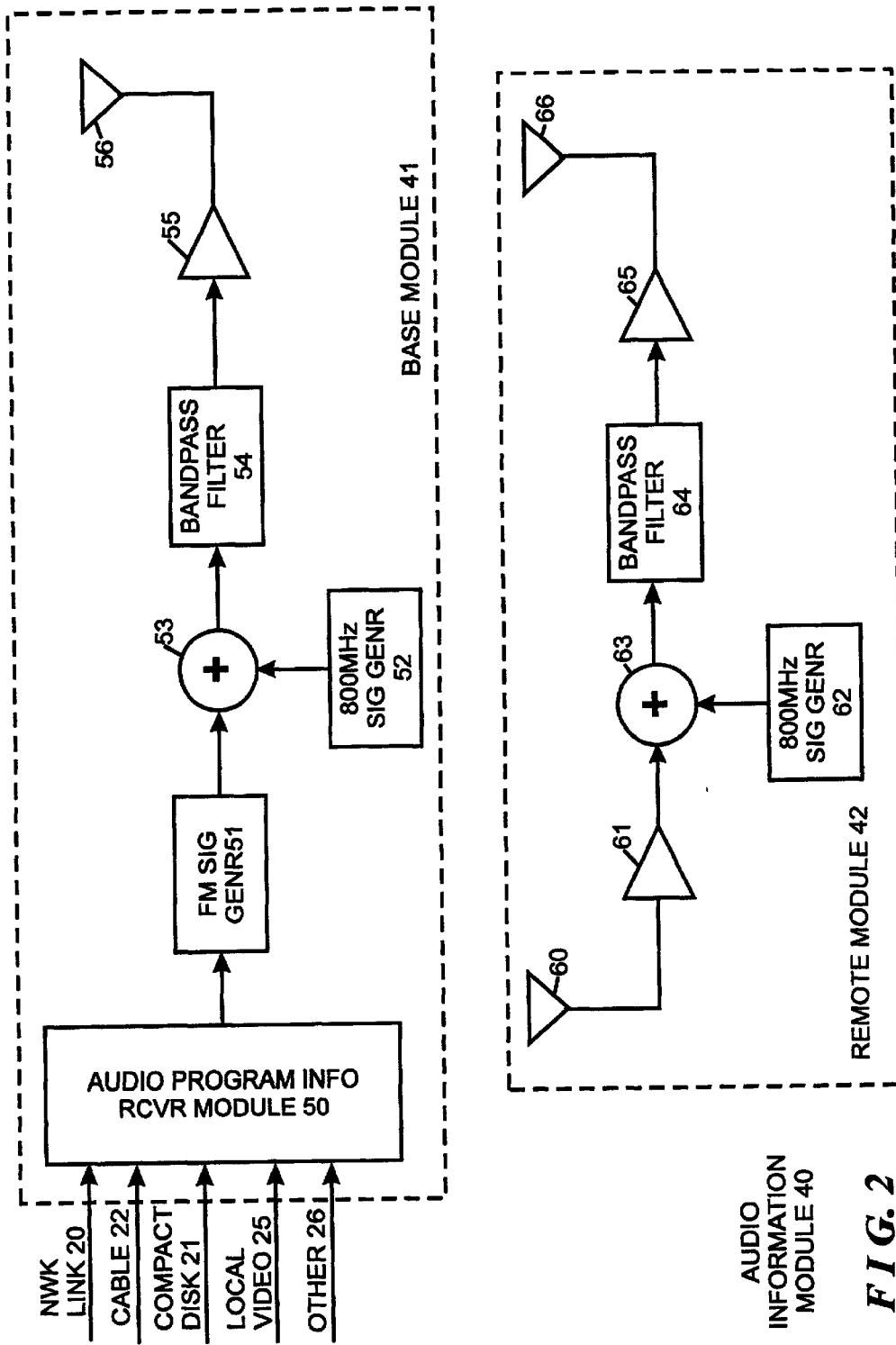
FIG. 2 depicts a functional block diagram of a portion of a home server useful in the home area network depicted in FIG. 1 for providing audio program information over local radio broadcast.

FIG. 2 depicts functional block diagrams of an illustrative base module 41 and remote module 42 useful in the home area network 10 described above in connection with FIG. 1. With reference to FIG. 2, base module 41 includes an audio program information receiver module 50, an FM signal generator 51, an 814 MHz signal generator 52, a mixer 53, a bandpass filter 54, an output amplifier 55 and an antenna 56. The audio program information receiver module 50 receives the audio program information from the various audio program information sources, as described above, and provides one or more of them to the FM signal generator 51. In addition, if the audio program information is in, for example, textual form, the audio program information receiver module 50 can, in a manner similar to a voice synthesizer, generate a voice signal therefrom for provision to the FM signal generator 51. The audio program information source or sources that are selected to provide audio program information to the FM signal generator 51, as well as the particular frequency or frequencies in the FM signal band at which the audio program(s) is (are) to be broadcast may be selected by an operator. Preferably, the frequency of frequencies will be such as to not cause interference with, or be interfered with, FM signals from FM broadcast outlets.

The FM signal generator 51, in turn, receives the audio program information from the audio program information receiver module 50 and uses the audio program information to generate one or more FM signals therefrom. Generally, it will be expected that, if multiple audio programs are to be broadcast by the audio information module 40 contemporaneously, each will be broadcast on a separate FM signal, and the FM signal generator 51 can provide an FM signal for each such audio program. One or more of the FM signals generated by the FM signal generator 51 may be monaural if the respective audio program is, for example, monaural. On the other hand, one or more of the FM signals generated by the FM signal generator 51 may be stereophonic, which may be desirable if the respective audio program is stereophonic. It will be appreciated that the FM signal generator 51 may, however, generate a monaural FM signal for any audio program that is stereophonic, in which case the FM signal generator 51 can combine the right and left audio channels of the stereophonic audio program before generating the FM signal therefor. Similarly, the FM signal generator 51 may generate a stereophonic FM signal for any audio program that is monaural, in which case the FM signal generator may use the monaural audio program for either the left or right stereophonic channel, or both stereophonic channels. In any case, the FM signal generator 51 provides the FM signals generated thereby to the mixer 53.

The mixer 53 receives the FM signal(s) provided by the FM signal generator 51 and an 814 MHz signal generated by the 814 MHz signal generator 52 and mixes them to generate signals whose frequencies are the sum and difference of the frequencies of the signals from the FM signal generator 51 and 814 MHz signal generator 52. Accordingly, if the FM signal(s) provided by the FM signal generator 51 are nominally 100 MHz (actually falling into the 88–108 MHz FM frequency band), the mixer 53 will mix the FM signal(s) and the 814 MHz signals to generate signals having a nominal frequency of 900 MHz (actually falling into the 902–922 MHz frequency band) and other signal having a nominal frequency of 700 MHz (actually falling into the 726–706 MHz frequency band). It will be appreciated that the particular frequencies in each of the 700 MHz and 900 MHz frequency band that will be generated by the mixer 53 will depend on the particular frequencies of the signals in the 100 MHz FM band that are provided by the FM signal generator 51. In addition, it will also be appreciated that the signals in the 700 MHz and 900 MHz frequency bands will be frequency modulated signals.

The signal or signals generated by the mixer 53 are provided to the bandpass filter 54. The bandpass filter 54 allows signals in the 900 MHz frequency band to pass, and filters out signals in other frequency bands, including signals in the 700 MHz frequency band. Thus, the signal or signals that the bandpass filter 54 provides to the output amplifier 55 is or are the signals in the 900 MHz band. The output amplifier 55, in turn, amplifies the signal(s) provided thereto, and provides the amplified signals to the antenna 56 for transmission.

The signals transmitted by the antenna 56 of the base module 41 are received by the remote module or modules 42 that are within range of the base module 41. Each remote module 42 includes a receive antenna 60, an input amplifier 61, an 814 MHz signal generator 62, a mixer 63, a bandpass filter 64, an output amplifier 65 and a transmit antenna 66. The receive antenna receives the 900 MHz signal or signals that are transmitted by the base module 41 and provides the signal or signals to the input of input amplifier 61. It will be appreciated that the signal or signals provided by the receive antenna to the input amplifier 61 may include not only the signal(s) transmitted by the base module 41, but also signals of other frequencies that may be received, including signals outside of the 900 MHz frequency band. As will be made clear below, the remote module 42 need not have a tuner or filter to filter out signals that are outside of the 900 MHz frequency band prior to providing the signal(s) to the input amplifier 61.

The input amplifier 61 amplifies the signal(s) provided thereto by the receive antenna 60. The input amplifier 61 may be a relatively broadband amplifier, in which case it can amplify signals input thereto in a relatively broad frequency range, which may include signals well outside of the 900 MHz frequency band. Alternatively, the input amplifier may be selected so as to amplify primarily signals in the 900 MHz frequency range.

The mixer 63 receives the amplified signal(s) provided by the input amplifier 61 and an 814 MHz signal generated by the 814 MHz signal generator 62 and mixes them to generate signals whose frequencies are the sum and difference of the frequencies of the signals from the input amplifier 61 and 814 MHz signal generator 62. Accordingly, if the amplified signal(s) provided by the input amplifier 61 in the 100 MHz frequency band (actually falling into the 88–108 MHz FM frequency band), the mixer 63 will mix those amplified signal(s) and the 814 MHz signals to generate signal(s) having a nominal frequency of 100 MHz (actually falling into the 88–108 MHz frequency band) and other signal(s) having a nominal frequency of 1700 MHz (actually falling into the 1702–1722 MHz frequency band). If the amplified signals provided by the input amplifier 61 includes signals outside of the 900 MHz frequency band, the mixer 63 will also generate output signals whose frequencies are the sum and difference of the frequencies of those signals and the 814 MHz signal provided by the 814 MHz signal generator 62. It will be appreciated that the particular frequencies in each of the 100 MHz and 1700 MHz frequency band that will be generated by the mixer 63 from the signal(s) received from the base module 41 will depend on the particular frequencies in of the signals the 900 MHz FM band that are provided by the base module 41.

The signal or signals generated by the mixer 63 are provided to the bandpass filter 64. The bandpass filter 64 allows signals in the FM frequency band, 88–108 MHz to pass, and filters out signals in other frequency bands, including signals in the 1700 MHz frequency band and signals outside of the 900 MHz signal band that might have been received by the remote module 42. Thus, the signal or signals that the bandpass filter 54 provides to the output amplifier 65 is or are the signals in the FM frequency band. The output amplifier 65, in turn, amplifies the signal(s) provided thereto, and provides the amplified signals to the antenna 66 for transmission. Preferably, the output amplifier 65 will amplify the signal such that the signal as transmitted by the antenna 66 will be within the power limitations specified by government regulations, if any.

The invention provides a number of advantages. In particular, the invention provides an arrangement for providing a home area network that includes an audio information module that can distribute audio program information received from one or more sources to radio receivers in the home.

In addition, by providing a separate base module 41 and one or more remote modules 42, the home area network 10 can achieve good coverage of portions of a home for which FM signal coverage is desired, regardless of where in the home the server 12 is located. For example, if the server is located in the basement of a home and coverage is desired in the second floor, the remote module can be located on the second floor to readily provide the desired coverage.

It will be appreciated that a number of changes and modifications may be made to the home area network described above in connection with FIGS. 1 and 2. For example, if the home is of appropriate size, or if the regulatory situation is such that higher power levels can be used in the FM frequency band (88–108 MHz), the use of separate base and remote modules 41 and 42 may not be needed. In that case, the output from the FM generator 51 can be coupled directly to the output amplifier 55 to permit signals in the FM In addition, although the audio information module 40 has been described as making use of the 900 MHz band in connection with transmission between the base module 41 and the remote module(s) 42, it will be appreciated that any convenient unlicenced frequency band can be used in which personal broadcast is permitted.

Generally, in the 900 MHz frequency band, under current US federal government regulations it is desired that the signals not remain at the same frequency in the band for more than a selected period of time. In that case, the 814 MHz signal generators 52 and 62 can be "spread spectrum" generators that are enabled to "frequency hop," that is, periodically shift their frequencies, with a period and frequency differential that is known to both generators 52 and 62.

Furthermore, it will be appreciated that the base module 41, instead of initially modulating the audio program information onto signals in the 88–108 MHz FM frequency band and then re-modulating them onto signals in the 900 MHz frequency band, can modulate the audio program information directly onto signals in the 900 MHz frequency band. In that case, instead of providing separate FM signal generator 51, 814 MHz signal generator 52, mixer 53, and bandpass filter 54, the base module 41 can be provided with a signal generator capable of generating frequency-modulated signals in the 900 MHz frequency band, or other frequency band if another frequency band is to be used.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. An audio program distribution arrangement for use in connection with a server in a home area network, the audio program distribution arrangement being configured to distribute audio programming over a local audio link, the audio program distribution arrangement comprising:

an audio programming information receiver module configured to receive audio programming information from a plurality of sources;

an audio programming information assembler module configured to generate assembled audio programming information by selectively assembling said audio programming information as received by the audio programming information receiver module into a first selected set of frequencies for transmission over the local audio link;

a control module configured to control the audio programming information receiver module and the audio programming information assembler module; and a broadcast arrangment configured to broadcast the assembled audio programming information over the wireless, local audio link wherein the broadcast arrangement further comprises:

a base module configured to receive the assembled audio programming information from the audio programming information assembler module and transmit the assembled audio programming information over a second selected set of frequencies;

at least one remote module configured to receive the assembled audio programming information over the second selected set of frequencies and to convert the received assembled audio programming information to the first selected set of frequencies for broadcast over the wireless audio link.

2. An audio program distribution arrangement as defined in claim 1 in which the second selected set of frequencies is selected to be such that the base module can broadcast the assembled audio programming information thereover using a higher amount of power than is permitted over the first selected set of frequencies.

3. An audio program distribution arrangement as defined in claim 2 in which the first selected set of frequencies comprises the FM frequency band.

4. An audio program distribution arrangement as defined in claim 2 in which the second selected set of frequencies comprises an unlicenced frequency band in which personal broadcast is permitted.

5. An audio program distribution arrangement as defined in claim 4 in which the second selected set of frequencies comprises a frequency band proximate 900 MHz.

6. An audio program distribution arrangement as defined in claim 1 in which the base module comprises:

a base signal generator configured to receive the assembled audio program information and modulate the received assembled audio program information onto the first set of frequencies;

a base mixer configured to receive the modulated assembled audio information generated by the first signal generator and modulate the modulated assembled audio information onto the second set of frequencies for broadcast to the at least one remote module.

7. An audio program distribution arrangement as defined in claim 6 in which the base module further comprises an amplifier configured to amplify the twice modulated assembled audio information generated by the base mixer prior to it being broadcast.

8. An audio program distribution arrangement as defined in claim 6 in which the base mixer is configured to periodically shift the second set of frequencies within a selected frequency band.

9. An audio program distribution arrangement as defined in claim 1 in which the at least one remote module comprises:

a remote receiver configured to receive the twice modulated assembled audio information broadcast on the first selected set of frequencies;

a remote mixer configured to receive the twice modulated assembled audio information received by the remote receiver and modulate the twice modulated assembled audio information onto the first set of frequencies for broadcast over the wireless audio link.

10. An audio program distribution arrangement as defined in claim 9 in which the remote module further comprises an amplifier configured to amplify the thrice modulated assembled audio information generated by the remote mixer prior to it being broadcast.

11. An audio program distribution arrangement as defined in claim 9 in which the remote mixer is configured to periodically shift the second set of frequencies within a selected frequency band.

* * * * *